(12) United States Patent
Grattan et al.

(10) Patent No.: US 9,587,995 B2
(45) Date of Patent: Mar. 7, 2017

(54) OPTICAL MONITORING SYSTEM

(71) Applicant: CITY UNIVERSITY, London (GB)

(72) Inventors: Ken Grattan, London (GB); Tong Sun, London (GB); Talal Ous, London (GB)

(73) Assignee: City University, London (GB)

( * ) Notice: Subject to any disclaimer, the term of this patent is extended or adjusted under 35 U.S.C. 154(b) by 60 days.

(21) Appl. No.: 14/764,271

(22) PCT Filed: Nov. 7, 2013

(86) PCT No.: PCT/EP2013/073314
§ 371 (c)(1),
(2) Date: Jul. 29, 2015

(87) PCT Pub. No.: WO2014/072436
PCT Pub. Date: May 15, 2014

(65) Prior Publication Data
US 2015/0362385 A1    Dec. 17, 2015

(30) Foreign Application Priority Data
Nov. 7, 2012  (GB) .................................. 1220078.8

(51) Int. Cl.
*G01B 11/16* (2006.01)
*G01L 1/24* (2006.01)
(Continued)

(52) U.S. Cl.
CPC ................ *G01L 1/246* (2013.01); *B60L 5/20* (2013.01); *G01K 11/3206* (2013.01); *B60L 2200/26* (2013.01); *B60M 1/28* (2013.01)

(58) Field of Classification Search
CPC ... G01L 1/246; B60L 5/20; B60L 5/26; B60L 2200/24; B60L 2200/30; B60L 5/00; G01K 11/3206; B60M 1/23; B60M 1/00
See application file for complete search history.

(56) References Cited

U.S. PATENT DOCUMENTS 6,125,216 A * 9/2000 Haran ..................... G01L 1/246
250/227.14
6,418,397 B1 * 7/2002 Brand ...................... B60L 5/28
191/50
(Continued)

FOREIGN PATENT DOCUMENTS

| GB | 2408570 A | 6/2005 |
|----|-----------|--------|
| WO | 2006114562 A1 | 11/2006 |
| WO | 2014072436 A1 | 5/2014 |

OTHER PUBLICATIONS

Ecke, Wolfgang ,"On-line characterization of impacts on electrical train current collectors using integrated optical fiber grating sensor network",2005, SPIE.*

(Continued)

*Primary Examiner* — Kara E Geisel
*Assistant Examiner* — Maurice Smith
(74) *Attorney, Agent, or Firm* — Finch & Maloney PLLC (57) ABSTRACT

A monitoring system for an electric vehicle that draws current from a conductor is provided. The monitoring system includes a plurality of sensor modules distributed at spaced intervals throughout a conducting block of a current collector. The conducting block contacts the conductor in operation of the vehicle. Each sensor module comprises a strain sensor configured to output a first optical signal that reflects changes in strain and temperature of the conducting block and a strain-isolated temperature sensor that is configured to output a second optical signal that reflects changes in temperature of the conducting block. The monitoring system also includes an optical source for illuminating each sensor module and an optical signal interpretation module configured to receive first and second optical signals from each said sensor module. The optical signal interpretation module is configured to determine, from the optical signals, (Continued)

a temperature-independent strain measurement for each said sensor module.

20 Claims, 3 Drawing Sheets (51) Int. Cl.
*B60L 5/20* (2006.01)
*G01K 11/32* (2006.01)
*B60M 1/28* (2006.01)

(56) References Cited

U.S. PATENT DOCUMENTS

2001/0026362 A1* 10/2001 Gleine ............... G01K 11/3206
356/32
2007/0000744 A1* 1/2007 Craig ..................... B60L 5/205
191/2
2007/0107529 A1* 5/2007 Maurin ................ G01B 11/165
73/800
2010/0061678 A1* 3/2010 Swinehart ........ B29D 11/00663
385/12

OTHER PUBLICATIONS

PCT Search Report and Written Opinion for PCT Application No. PCT/EP2013/073314 mailed on Apr. 22, 2014, 9 pages.

* cited by examiner

OPTICAL MONITORING SYSTEM

FIELD

This invention relates to an optical monitoring system, in particular to a monitoring system that includes a plurality of optical sensor modules.

In one envisaged implementation, the system disclosed may be utilised for monitoring a current collector, for example a collector of the type that is employed by an electric vehicle (such as a train or tram) to draw current from a conductor, for example an overhead conductor wire or a conducting rail. In other applications the teachings of the present invention may be employed to monitor other types of current collectors, for example current collectors employed in electrical motors and the like.

The teachings of the present invention are provided below in the context of a monitoring system for an electric locomotive that includes a pantograph to draw current from an overhead conductor. It should be noted, however, that this particular application is merely one illustrative application of the teachings of the invention and that many other applications exist. As such, the following description should not be considered to be a limitation of the scope of the present invention to the particular application described hereafter in detail.

BACKGROUND

Many electric locomotives derive power from an overhead contact wire system (commonly known as an overhead contact line or OCL). Such systems typically comprise one or more pantograph mechanisms that are placed on the roof of a locomotive. Each pantograph mechanism comprises a current collector that abuts against the OCL in use and enables current to be drawn from the overhead wire for driving the locomotive, and a mechanism for raising or lowering the current collector relative to the locomotive. Such current collectors typically comprise a block of conducting material (typically, carbon) that abuts against the OCL in use and a carrier on which the block is mounted—the carrier being coupled to the aforementioned mechanism.

In typical pantograph mechanisms the collector is forced against the OCL by the aforementioned raising/lowering mechanism. The force with which the collector is held against the OCL is important in that too much force increases the rate at which the collector wears, increases the operating temperature of the collector block and increases the risk of damage to the collector and OCL, whereas too little force can cause arcing between the OCL and the collector—which arcing may damage the collector and/or OCL and cause excessive noise.

As will be appreciated, any damage caused to the OCL has a negative effect on both track and train operators, and it is often the case that the company responsible for damaging the OCL is charged a penalty for preventing other company's scheduled operation of train or track. Similarly, accelerated wear of collectors or damage thereto inevitably increases maintenance costs for the train operators.

It would be advantageous, therefore, to monitor the strain and temperature of a collector as it is forced against and moved along an OCL, and one such system that purports to provide this functionality is disclosed in UK Patent No. 2408570.

This UK patent discloses a monitoring system that employs a series of optical Fibre Bragg Grating (FBG) sensors (the like of which are well known in the art) to monitor the strain experienced by the collector and the temperature of the collector as the collector abuts against and moves along an OCL.

In the preferred arrangement described in the example set out in detail on pages 10 to 12 of this UK patent, it is disclosed that the optimum position for mounting FBG strain sensors is at the base of the carrier for the conducting block, and that the optimum position for mounting FBG temperature sensors is at the interface between the block and the carrier. The patent further discloses that a collector was developed which had three sensor pads fitted for strain measurement, each said pad including a strain FBG and a compensating FBG temperature sensor. Each of the pads was adhered to the base of the carrier with the strain sensor in contact with the carrier. The carrier was then bonded to a carbon block that included an embedded FBG temperature sensor. The resulting collector configuration is shown in cross-section in FIG. 2b of the UK patent.

The arrangement described in this patent was developed as part of a Fifth Framework Programme project (Project Reference: G3RD-CT-2002-00812) known as "CATIEMON", and although the aforementioned patent asserts that the collector described therein provided a means for permanently monitoring the thermal and mechanical strain load caused by a train with a pantograph running under an OCL, it is actually the case that the CATIEMON project from which the collector described in the UK patent emerged was declared to be a failure and the mooted monitoring system was not implemented. The principal reason for this was that the monitoring system developed under the auspices of the project (as described in the patent) did not in fact function as expected, and did not reliably enable the strain and temperature of a collector to be accurately monitored.

The present invention seeks to address these problems and in one aspect to provide a monitoring system that can accurately and reliably measure the strain and temperature of a current collector.

SUMMARY

To this end, a presently preferred embodiment of the present invention provides a monitoring system for an electric vehicle (such as a locomotive) that draws current from a conductor (such as an OCL or a conducting rail), the system comprising: a plurality of sensor modules distributed at spaced intervals throughout a conducting block for a current collector that further comprises a carrier for said conducting block, wherein the conducting block contacts the conductor in operation of the vehicle and each said sensor module comprises an FBG (Fibre Bragg Grating) strain sensor configured to output a first optical signal that varies in response to changes in strain and temperature of the conducting block and a strain-isolated FBG temperature sensor that is configured to output a second optical signal that varies only in response to changes in temperature of the conducting block; an optical source for illuminating each said sensor module; means for optically coupling said optical source to each said sensor module; and an optical signal interpretation module configured to receive first and second optical signals from each said sensor module via said optical coupling means, said optical signals being generated by said sensor modules in response to illumination of said sensor modules by said optical source, said interpretation module being configured to capable of determining from said optical signals a temperature-independent strain measurement for each said sensor module.

This implementation of the teachings of the invention results from the inventors' realisation that by mounting sensor modules on the carrier, as taught in the aforementioned patent, the previously proposed monitoring system can only determine when the collector as a whole is subjected to excessive strain. Such a system cannot, for example, determine when the conductor block has worn down to such an extent that the carrier is in danger of coming into contact with the OCL, or indeed enable irregular sweeping of the surface of the block by the OCL to be detected (which sweeping may indicate incipient failure of the block). The aforementioned preferred embodiment addresses these drawbacks.

Another drawback of the arrangement described in the aforementioned UK patent is that whilst the sensor modules each include a compensating temperature sensor the inventors of this prior patent do not appear to have appreciated is that if these compensating temperature sensors are subject to an applied strain, they will not accurately measure temperature and hence their function as a means for accurately compensating for temperature increases in the strain sensors will be compromised. By providing sensor modules with strain-isolated temperature sensors, the aforementioned preferred embodiment addresses this drawback.

A further drawback of the arrangement described in the aforementioned UK patent, is that by providing discrete temperature sensors and strain sensor modules, the monitoring system is needlessly complicated. The aforementioned preferred embodiment, by providing sensor modules that measure both temperature and strain, avoids the need for separate temperature and strain sensors (as taught in the aforementioned prior patent) and hence is significantly simpler to implement than the (ultimately ineffective) system disclosed in the aforementioned prior patent.

In contrast to the system disclosed in this prior patent, an implementation of the teachings of the present invention enables both the measurement of the force between a pantograph current collector and an OCL and the position of the OCL on the current collector to be measured. Both contact force, measured with respect to various other parameters such as position, speed, etc. and lateral contact wire position as seen by the pantograph are of interest when monitoring the performance of both the pantograph and the current supply infrastructure.

In an envisaged implementation, the interpretation module may be further configured to be capable of determining from said optical signals a strain-independent temperature measurement for each said sensor module.

In another envisaged implementation, the interpretation module may be further configured to be capable of determining the position of the conductor relative to the conducting block that contacts said conductor. An advantage of this implementation is that it is then possible to determine whether an OCL, for example, is tracking properly over the conductor block, and from this one can infer whether components of the current supply infrastructure designed to hold the OCL in position are functioning correctly.

In one envisaged implementation one or more of the sensor modules may be encapsulated within the conductor block. In another envisaged implementation, one or more of the sensor modules may be provided in a channel formed in said conductor block. In this latter arrangement it is preferred for the channel to be provided in a face of the conductor block that abuts against the carrier in use.

In a particularly preferred arrangement, each sensor module is substantially the same distance from a face of the block that abuts against the conductor in use.

In a preferred implementation the conductor block is of carbon, but it will be apparent to persons skilled in the art that other conducting materials may instead be utilised without departing from the scope of the invention.

In an envisaged implementation the strain-isolated temperature sensor comprises a length of optic fibre having a first end portion and a second end portion, means fixing said first and second ends in position relative to one another so that a portion of fibre extending between said end portions is isolated from strain, and an FBG temperature sensor provided in said strain isolated fibre portion.

The strain isolated temperature sensor may include a housing to which said fixing means is coupled and within which said strain-isolated portion of said fibre extends.

In an envisaged implementation, the strain isolated portion of fibre may be substantially surrounded by a heat conducting thermal compound (otherwise known in the art as thermal gel, thermal paste, heat paste, heat sink paste, heat transfer compound, or heat sink compound). The thermal compound may be ceramic based (for example, a compound including beryllium oxide, aluminium nitride, aluminium oxide, zinc oxide or silicone dioxide), metal based (for example a compound including silver or aluminium), carbon based or even liquid metal based. In a particularly preferred implementation the thermal compound extends between the fibre and the housing so as to reduce the likelihood of the fibre coming into contact with the housing.

In one implementation the housing is of heat conducting material and is secured to the block with a thermal compound between the housing and the block to provide enhanced thermal conductivity between the block and the housing.

In another implementation, the fixing means may be coupled directly to said conductor block.

In one arrangement the strain isolated portion of said fibre is not under any applied tension. In another arrangement the said strain isolated portion of said fibre is under a predetermined substantially fixed tension.

In a preferred arrangement the system further comprises a position determining module (such as a GPS module) for determining the geographical position of the electric vehicle.

In one configuration, the signal interpretation module may be arranged to determine the temperature independent strain measurement by subtracting a signal representative of a change in temperature as detected by the temperature sensor from a signal representative of a change in strain and temperature as detected by the strain sensor. The signal interpretation module may, alternatively or additionally, be configured to determine the position of the conductor relative to the conductor block by comparing changes in strain as detected by respective strain sensors of a plurality of said sensor modules.

The system may comprise means for storing data. The means for storing data may be configured to store one or more of: temperature data, strain data, conductor position data and vehicle position data.

The monitoring system disclosed herein may be used in place of existing systems for automatically raising or lowering a pantograph, or as an adjunct thereto. For example, the signal interpretation module may be configured to determine whether a measured strain (temperature) exceeds a predetermined threshold. In this case, the signal interpretation module may be configured, in the event that a measured strain (temperature) should exceed said threshold, to output a signal indicating that the conductor block should be withdrawn from contact with the conductor. In another implementation the signal interpretation module may be configured, in the event that a measured strain (temperature) should exceed said threshold, to control a mechanical system for urging the conductor block into contact with the conductor to withdraw said conductor block from contact with the conductor. In another envisaged implementation the monitoring system may form part of a closed loop system operable to control the force with which a conductor block is abutted against a conductor in use.

In one implementation the optical coupling means may comprise a plurality of optic fibres, a said fibre of said plurality being coupled to a said sensor module of said plurality.

In another implementation, the optical coupling means may comprise an optic fibre, said sensor modules being optically coupled together and to said source by said optic fibre.

In this latter case, the signal interpretation module may be configured to distinguish between individual sensor modules of said plurality on the basis of the time elapsed between illuminating said sensor modules with said source and the time of receipt of signals from each said module (said signals being responsive to said illumination). In another arrangement each sensor module may be configured to generate a response in a predetermined unique frequency range and said signal interpretation module may be configured to distinguish between signals from respective modules by determining in which said frequency range said signals fall.

Another aspect of the present invention relates to a conductor block for use with the system described herein, said conductor block being configured for attachment to a carrier of a current collector that suitable for drawing current from a conductor, the conductor block comprising: a plurality of sensor modules distributed at spaced intervals throughout the conducting block, each said sensor module comprising an FBG (Fibre Bragg Grating) strain sensor configured to output a first optical signal that varies in response to changes in strain and temperature of the conducting block and a strain-isolated FBG temperature sensor that is configured to output a second optical signal that varies (only) in response to changes in temperature of the conducting block.

Other aspects, embodiments, features and advantages are set out elsewhere in the application.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION

Illustrative implementations of the teachings of the present invention will now be provided, and particular reference will be made to a monitoring system for an electric locomotive that includes a pantograph to draw current from an overhead conductor. As aforementioned, it should however be noted that this particular application is merely one illustrative application of the teachings of the invention and that many other applications exist. As such, the following description should not be considered to be a limitation of the scope of the present invention to the particular application described hereafter in detail.

Figure 1:
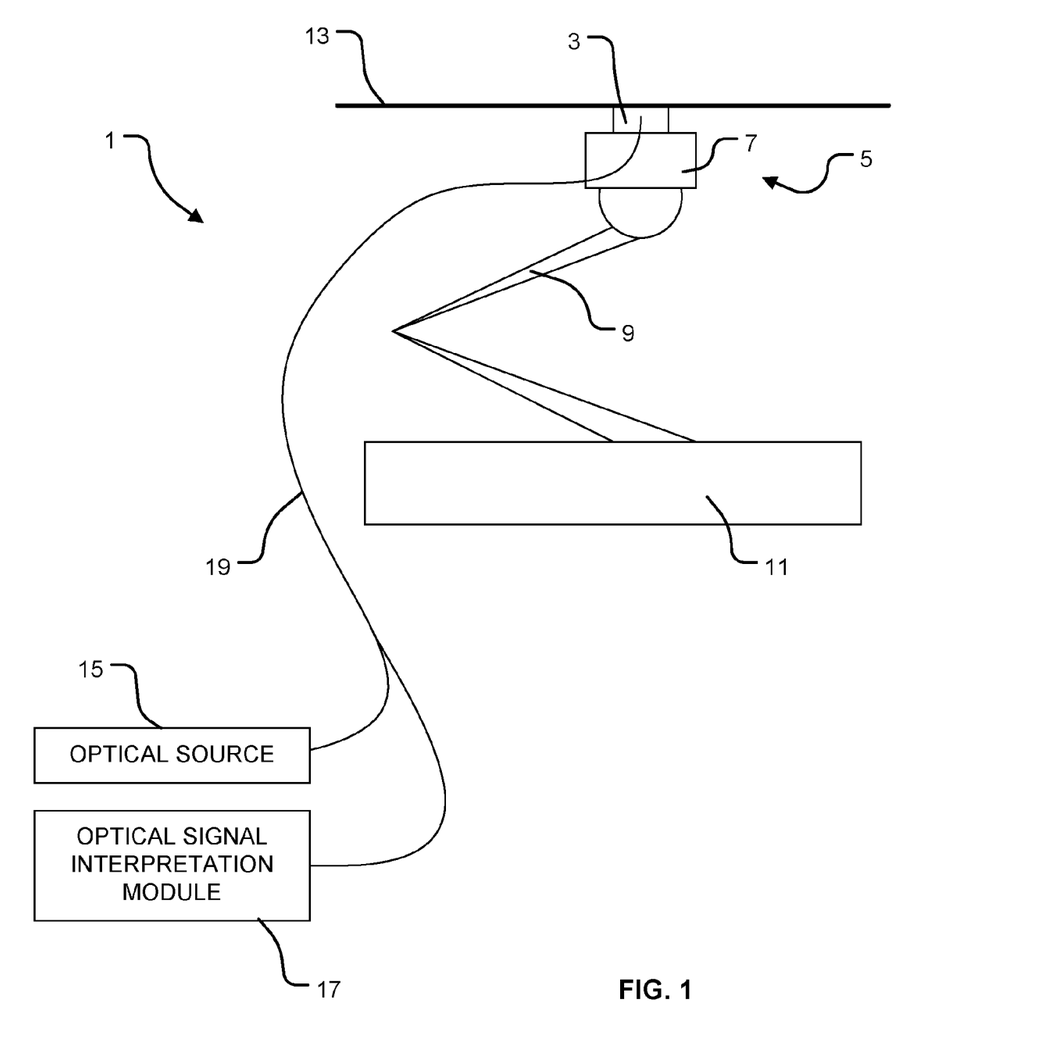
FIG. 1 is a schematic representation of a monitoring system implementing the teachings of the present invention.

With this proviso in mind, reference will now be made to FIG. 1 in which there is depicted a schematic representation of the monitoring system 1.

The system comprises a conducting block 3 and a carrier 7 for the block 3 that together form a current collector 5. The current collector 5 is coupled to a mechanism 9 for raising or lowering the carrier 7 and conducting block 3 with respect to an electric vehicle 11. The mechanism 9 is configured to urge the conducting block 3 into abutment, in this particular arrangement, with an overhead conducting line (OCL) 13 so that current may be drawn from the OCL 13 and supplied to the vehicle 11.

The conducting block 3 can be of any suitable conducting material. For example, in one envisaged arrangement the conducting block is—at least principally—of carbon.

The conducting block 3 includes a plurality of sensor modules (not shown in FIG. 1) that are, in this particular arrangement, coupled in series to one another and to an optical source 15 and an optical signal interpretation module 17 by means of optical coupling means that comprises an optic fibre 19.

In another envisaged implementation the optical coupling means comprises a plurality of optic fibres with each said fibre of said plurality coupling a said sensor module of said plurality to the optical source 15 and the optical signal interpretation module 17.

In a preferred implementation, the optical source 15 comprises a broadband (i.e. wide spectrum) light source, for example a broadband LED light source. This arrangement is particularly preferred as it enables individual sensor modules to be tuned to respond to illumination by the source by emitting signals in a wavelength band distinct from those allocated to other sensor modules. In another envisaged implementation the light source could comprise a narrow wavelength source, such as a laser light source, and in this configuration signals from respective sensor modules may be distinguished from one another on the basis of the time of flight of signals between the source and the modules, that is to say the time elapsed between illumination of the sensor modules by the source and the receipt of signals back from the individual sensor modules.

Figure 2:
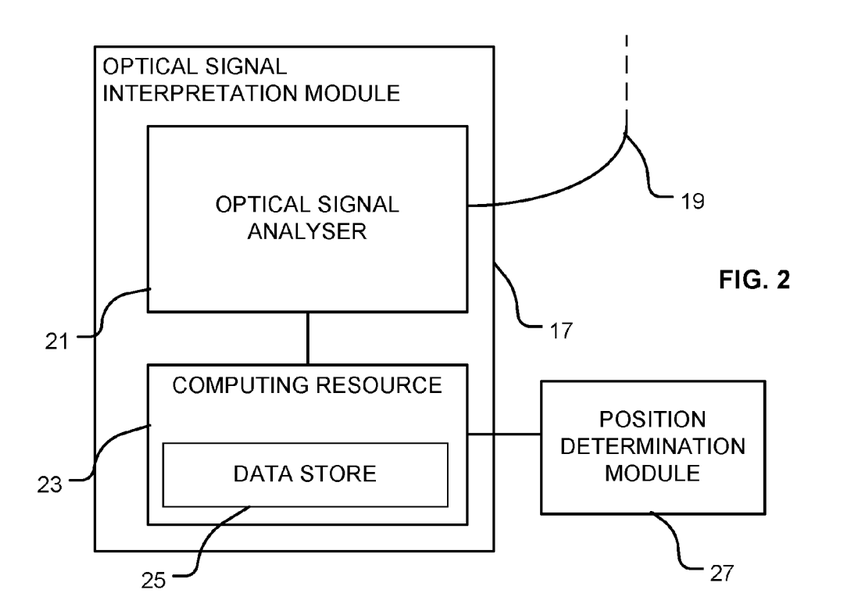
FIG. 2 is schematic representation of the optical signal interpretation module and optional attached components.

Referring now to FIG. 2, the optical signal interpretation module 17 can have many different forms, but in one envisaged arrangement the module 17 comprises an optical signal analyser 21 coupled to the optic fibre 19, and a computing resource 23 such as a personal computer (PC) or equivalent. In the arrangement depicted in FIG. 2, the computing resource includes an integral data store 25 for the storage of data, but it will be appreciated that the data store may be external to the module 17.

In a particularly preferred arrangement, the computing resource 23 is coupled to a position determination module 27 that may comprise a GPS device that is adapted to determine the position of the module (and hence any vehicle to which it is affixed) by triangulation using signals from satellites orbiting the earth. Other position determination modules, such as a module that implements dead-reckoning functionality, may instead be provided without departing from the scope of the invention.

Figures 3, 4, 5:
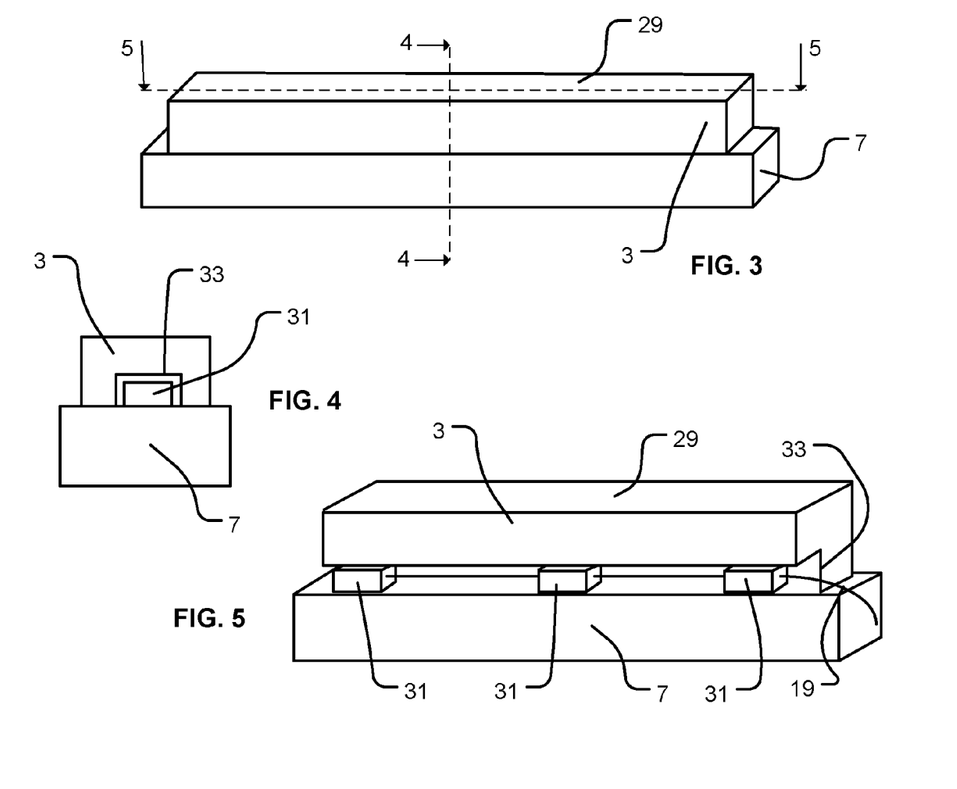
FIG. 3 is a schematic perspective view of a current collector.
FIG. 4 is a transverse cross-sectional view along the line 4-4 of FIG. 3.
FIG. 5 is a transverse cross-sectional view along the line 5-5 of FIG. 3.

Referring now to FIG. 3, there is shown a schematic perspective view of a conducting block 3 that is mounted on a carrier 7. The conducting block is typically, as aforementioned, of carbon and the carrier is typically of aluminium. In the context of a railway locomotive it is usual for the conducting block 3 to be around 1600 mm in length, a dimension that is necessary to accommodate the variation in lateral OCL position seen by a train traversing a curve across which the OCL 13 is stretched (forming a chord). Other factors affecting the position of the OCL relative to the vehicle 11 are vehicle sway (as a result of centrifugal force), oscillations due to motion and wind acting on the OCL or the vehicle. It is also the case that on straight sections of track, artificial offsets are introduced in the form of a stagger, or zig-zag, so that the OCL sweeps across an upper face 29 of the conducting block 3, rather than run in one position on the block 3 (which arrangement which would cause localised wear and premature failure of the block 3).

In a railway application it is normal for the collector block to have a curved upper surface 29, but for ease of illustration the block 3 is shown in FIG. 3 as being generally rectangular.

Referring now to FIGS. 4 and 5, the block 3 has a plurality of sensor modules 31 distributed throughout it at spaced intervals. In one envisaged arrangement the sensor modules are evenly distributed throughout the block 3 as such as arrangement facilitates the accurate determination of OCL position relative to the block 3.

In this particular arrangement the sensor modules 31 are coupled together in series and located in a channel 33 formed in a face of the block 3 that abuts against the support 7 in use, and is therefore opposite the face 29 that abuts against the OCL. In other envisaged arrangements the sensor modules may be located in a channel that extends through the body of the block, between the face that contacts the OCL and the face that abuts against the support 7 (for example, midway between these faces). The channel 33 may even be formed in the face 29 of the block that contacts the OCL, if so desired. As aforementioned, it is envisaged that the sensor modules 31 need not be coupled in series, but could instead be coupled in groups or individually to the source 15 and optical signal interpretation module 17.

In a particularly preferred implementation the individual sensor modules are secured in a given position in the channel, for example by means of an adhesive. Spaces between adjacent sensor modules may be left open, or in another envisaged arrangement those spaces may be packed with the same material as the remainder of the block, for example carbon, or indeed with another suitable conductor.

Figure 6:
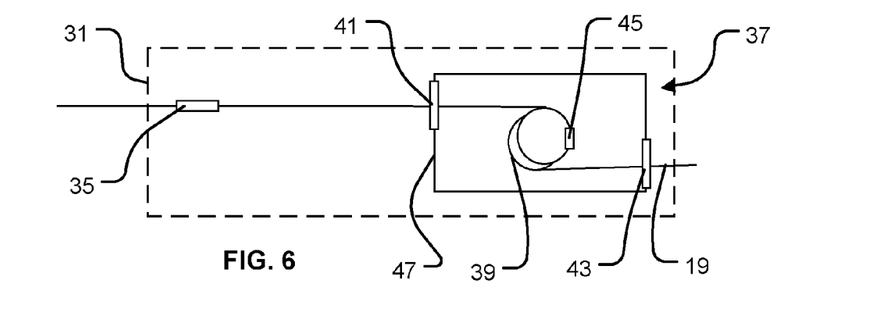
FIG. 6 is a schematic representation of a sensor module for use in the monitoring system of FIG. 1.

Referring now to FIG. 6 of the accompanying drawings, there is depicted a single sensor module 31 for use with the system described above.

The sensor module 31 comprises an FBG strain sensor 35 consisting of a grating formed in an optic fibre. Such sensors are well known in the art, and as such there is no need for the exact configuration of the strain sensor to be further described herein. The FBG strain sensor 35 is configured to respond to applied strain by varying the wavelength of light reflected back in response to illumination by the light source 15. However, as aforementioned, the block 3 will increase in temperature in use, and this temperature rise will cause the grating in the FBG strain sensor to expand, thereby affecting the wavelength at which light will be reflected. Thus the FBG strain sensor outputs a signal that is proportional both to temperature and applied strain.

Coupled to the FBG strain sensor is a strain-isolated FBG temperature sensor 37. The strain-isolated FBG temperature sensor 37 comprises a loop 39 of optic fibre that is secured at either end 41, 43, for example by means of a clamp, so that the loop 39 is isolated from applied strain. The loop includes an FBG sensor 45 formed in a manner well known in the art, and as the temperature of the block varies so the frequency of light reflected by the sensor 45 changes. To further isolate the sensor 45 from the applied strain, the sensor may be enclosed within a casing 47. The casing 47 may be filled with a heat conducting thermal compound so that heat transfer between the block 3 and sensor 45 is not compromised. Similarly, the casing 47 may be coated with thermal compound so that heat transfer between the block 3 and casing 47 is not compromised. In one envisaged implementation, the means for securing the fibre at either end 41, 43 of the loop 39 may be integrated into the casing.

As will be appreciated by persons skilled in the art, since the FBG temperature sensor 45 is strain isolated, the signal output by the sensor 45 varies only in response to temperature variations in the block 3.

In operation of the system, the light source 15 illuminates, via the optic fibre 19, the sensor modules provided in the conductor block 3, either on a continuous or pulsed basis. The FBG sensor modules generate signals in response to being illuminated by the source, and the optical signal analyser of the optical signal interpretation module 17 receives and analyses those signals. In particular, the optical signal analyser 21 determines the wavelength of the signals received and passes this information to the computing resource for further processing. In arrangements where the optical signal interpretation module 17 is coupled by a plurality of fibres to the sensors modules (with each fibre connecting one sensor module to the interpretation module 17), the sensor module from which a given signal has been received can be determined by identifying the channel on which the signal is received by the optical signal analyser 21.

In other arrangements the computing resource 23 may be configured to attribute signals to particular sensor modules on the basis of the wavelength of those signals (each sensor having been tuned to a discrete predetermined base wavelength, and respective wavelengths being sufficiently separated from one another to enable accurate wavelength changes to be measured), or by measuring the time elapsed between a pulse being emitted by the light source 15 and signals being received from the sensor modules (it being understood that the further away the sensor module are from the light source 15, the greater the time taken for the optical signal analyser 21 to receive a response).

As will be appreciated by persons skilled in the art, the aforementioned functionality may, if desired, be provided by an optical signal analyser 21 that incorporates a suitable computing resource.

The optical signal interpretation module 17 determines, based on the wavelength of light from the sensor modules, the strain $\epsilon_m$ applied to the block 3 and the change in temperature of the block 3 based on the following mathematical equations.

The mechanical strain applied to the block (as measured by the strain sensor 35) can be determined from the following equation:

$$\epsilon_m = \frac{1}{k} * \frac{\Delta\lambda}{\lambda_0} - \left(\alpha_{sp} + \frac{\alpha_\delta}{k}\right) * \Delta T \quad (1)$$

Where:
$\epsilon_m$=mechanical strain applied to block
K=1-p
P=photo-elastic coefficient
$\Delta\lambda$=the observed change in wavelength
$\lambda_0$=base wavelength of the sensor
$\alpha_{sp}$=expansion coefficient per K of the specimen
$\alpha_\delta$=change in refractive index; and
$\Delta T$=observed change in temperature The observed change in temperature, as measured by the strain-isolated FBG sensor 45, can be determined from the following equation:

$$\Delta T = \frac{1}{k*\alpha_{sp} + \alpha_\delta} * \frac{\Delta\lambda}{\lambda_0} \quad (2)$$

To calculate the mechanical strain $\epsilon_m$ one need only subtract the signal from the strain-isolated FBG sensor from the signal of the strain sensor, and this can be represented mathematically as follows:

$$\varepsilon_m = \frac{1}{k} * \left(\frac{\Delta\lambda_m}{\lambda_{0m}} - \frac{\Delta\lambda_c}{\lambda_{0c}}\right) \quad (3)$$

Where:
$\Delta\lambda_m$=wavelength shift of strain sensor
$\lambda_{0m}$=base wavelength of strain sensor
$\Delta\lambda_c$=wavelength shift of strain-isolated temperature sensor
$\lambda_{0c}$=base wavelength of strain-isolated temperature sensor Thus, merely by monitoring the change in wavelength from each sensor of each sensor module and comparing that change to the base wavelength for those sensors, the strain applied to the block can be calculated.

The strain data can be used to control the mechanism 9 that urges the block into abutment with the OCL so that the right amount of upward pressure is always applied. A threshold may also be defined, and if that threshold is exceeded the system may be configured to control the mechanism to drop the block and thereby avoid damaging the block and/or track infrastructure.

In addition to enabling strain to be calculated, the optical signal interpretation module can also output signals indicative of the change in temperature observed at each sensor module, thereby providing a useful early indicator of any potential hot-spots that might be developing.

Figure 7A:
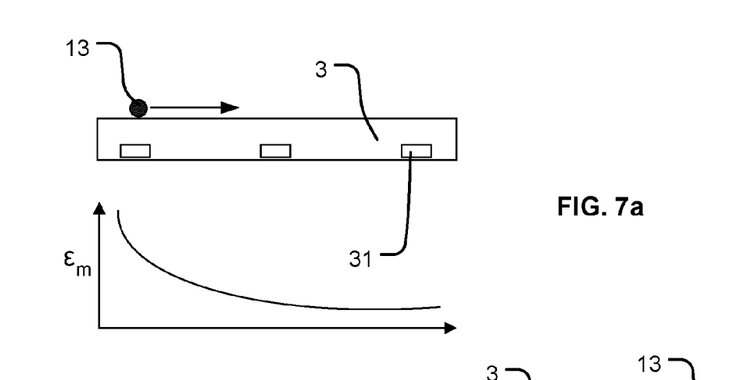
FIGS. 7(a) to 7(c) are schematic depictions of calculated strains with varying conductor position.
Figure 7B:
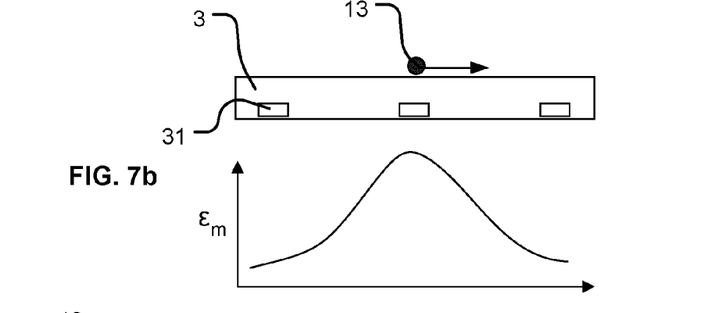
Figure 7C:
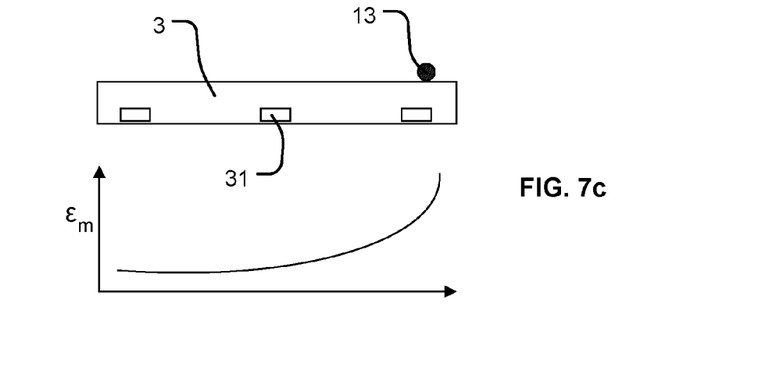

It is also possible to infer the position of the OCL relative to the block by looking at the relative calculated strains for each sensor module, as shown in FIGS. 17(*a*) to (*c*). In general, with a block that has three embedded sensor modules, the calculated strain for the first, left-most strain sensor (as shown in FIG. 17(*a*) will be at a maximum when the OCL abuts the block 3 at a position generally co-incident with the left-most sensor module, and the calculated strains for the remaining sensor modules will be smaller.

As the OCL tracks across the block towards the right, as shown in FIG. 7(*b*) the calculated strain for the middle sensor module will increase as the calculated strain for the left-hand sensor module drops off. Similarly, as the OCL tracks further to the right, as shown in FIG. 7(*c*), the calculated strain for the right sensor module will increase as the calculated strain for the middle sensor drops off.

If the OCL is properly supported and the block is in a good condition, then the OCL should track smoothly from one end of the block to the other and back again. If, however, the block is damaged then the OCL may jump across the surface of the block or be held at a given point. Thus, by looking at the relative rates of calculated strain change one can generally infer the overall condition of the block.

In more detail, by providing at least two sensor modules mounted in different positions the bending moment at respective sensor module positions can be calculated—thus providing the necessary information to resolve both force and eccentricity Furthermore, by combining this data with data from the position determination module it is possible to identify geographical locations where the OCL is not tracking smoothly across the block, and from this geographical locations where the track infrastructure (in particular the infrastructure supporting the OCL) might need attention.

Thus it can be seen from the foregoing that the teachings of the present invention provide the possibility of monitoring the condition of the block, of controlling the force with which the block contacts the OCL, and of identifying geographical locations where the track infrastructure may require attention.

All the foregoing data is, in one envisaged implementation, stored in the data store 25 for analysis. The system may be configured to provide a real-time display of measured strain and/or temperature information, and to operate one or more alarms if a predetermined strain and/or temperature threshold should be exceeded.

It will be appreciated from the foregoing that the teachings of the present invention provide several advantages over previously proposed arrangements. It will further be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

It should also be noted that whilst the accompanying claims set out particular combinations of features described herein, the scope of the present invention is not limited to the particular combinations hereafter claimed, but instead extends to encompass any combination of features herein disclosed.

The invention claimed is:

1. A monitoring system for an electric vehicle that draws current from a conductor, the system comprising:
   a plurality of sensor modules distributed at spaced intervals throughout a conductor block of a current collector, wherein the conductor block contacts the conductor in operation of the vehicle and each said sensor module comprises an FBG (Fibre Bragg Grating) strain sensor configured to output a first optical signal that varies in response to changes in strain and temperature of the conductor block and a strain-isolated FBG temperature sensor that is configured to output a second optical signal that varies in response to changes in the temperature of the conductor block;
   an optical source for illuminating each said sensor module;
   coupling apparatus configured to optically couple said optical source to each said sensor module; and
   an optical signal interpretation module configured to receive first and second optical signals from each said sensor module via said coupling apparatus, said optical signals being generated by said sensor modules in response to illumination of said sensor modules by said optical source, said interpretation module being configured to be capable of determining from said optical signals a temperature-independent strain measurement for each said sensor module.

2. The system according to claim 1, wherein said interpretation module is further configured to be capable of determining from said optical signals a strain-independent temperature measurement for each said sensor module.

3. The system according to claim 1, wherein said interpretation module is further configured to be capable of determining a position of the conductor relative to the conductor block that contacts said conductor.

4. The system according to claim 3, wherein said signal interpretation module is configured to determine a position of the conductor relative to the conductor block from relative temperature-independent strain measurements for said sensor modules.

5. The system according to claim 1, wherein one or more of the sensor modules is encapsulated within the conductor block.

6. The system according to claim 1, wherein one or more of the sensor modules is provided in a channel formed in said conductor block.

7. The system according to claim 1, wherein each sensor module is substantially the same distance from a face of a conductor block that abuts against the conductor in use.

8. The system according to claim 1, wherein said strain-isolated temperature sensor comprises:
a length of optic fibre having a first end portion and a second end portion,
fixings configured to fix said first and second end portions in position relative to one another so that a portion of fibre extending between said end portions is isolated from strain and comprises a strain-isolated fibre portion, and
an FBG temperature sensor provided in said strain-isolated fibre portion.

9. The system according to claim 8, wherein said strain-isolated temperature sensor comprises a housing to which said fixings are coupled and within which said strain-isolated portion of said fibre extends.

10. The system according to claim 9, wherein the housing is configured to substantially completely enclose at least the strain-isolated portion of said optic fibre.

11. The system according to claim 10, wherein the strain-isolated portion of fibre is substantially surrounded by a heat conducting thermal compound.

12. The system according to claim 9 wherein the housing is of heat conducting material and is secured to the block with thermal compound between the housing and the block to provide enhanced thermal conductivity between the block and the housing.

13. The system according to claim 8, wherein said fixings are coupled to said conductor block.

14. The system according to claim 8, wherein said strain-isolated portion of said fibre is not under any applied tension or is under a predetermined substantially fixed tension.

15. The system according to claim 1, wherein the signal interpretation module is configured to determine the temperature independent strain measurement by subtracting a signal representative of a change in temperature as detected by the temperature sensor from a signal representative of a change in strain and temperature as detected by the strain sensor.

16. The system according to claim 1, wherein the signal interpretation module is further configured to determine whether a measured strain exceeds a predetermined threshold.

17. The system according to claim 16, wherein the signal interpretation module is configured, in an event that a measured strain should exceed said threshold, to either: (i) output a signal indicating that the conductor block should be withdrawn from contact with the conductor, or (ii) control a mechanical system for urging the conductor block into contact with the conductor to withdraw said conductor block from contact with the conductor.

18. The system according to claim 17, wherein said signal interpretation module is configured to distinguish between individual sensor modules of said plurality on a basis of a time between illuminating said sensor modules with said source and a time of receipt of signals from each said module.

19. The system according to claim 17, wherein each said sensor module is configured to generate a response in a predetermined unique wavelength/frequency range and said signal interpretation module is configured to distinguish between signals from respective sensor modules by determining in which said wavelength/frequency range said signals fall.

20. A conductor block for use with the system of claim 1, said conductor block being configured for attachment to a current collector that further comprises a carrier for said conductor block, the conductor block comprising:
a plurality of sensor modules distributed at spaced intervals throughout the conductor block, each said sensor module comprising an FBG (Fibre Bragg Grating) strain sensor configured to output a first optical signal that varies in response to changes in strain and temperature of the conductor block and a strain-isolated FBG temperature sensor that is configured to output a second optical signal that varies in response to changes in temperature of the conductor block.

* * * * *